(12) United States Patent
Lenander

(10) Patent No.: US 7,722,299 B2
(45) Date of Patent: May 25, 2010

(54) TWIST DRILL

(75) Inventor: Anders Lenander, Tyresö (SE)

(73) Assignee: Sandvik Intellectual Property AB, Sandviken (SE)

( * ) Notice: Subject to any disclaimer, the term of this patent is extended or adjusted under 35 U.S.C. 154(b) by 987 days.

(21) Appl. No.: 11/441,346

(22) Filed: May 26, 2006

(65) Prior Publication Data

US 2007/0009336 A1 Jan. 11, 2007

(30) Foreign Application Priority Data

Jul. 5, 2005 (SE) .................................... 0501562

(51) Int. Cl.
*B23B 51/02* (2006.01)
(52) U.S. Cl. ..................... 408/230; 408/144
(58) Field of Classification Search ................ 408/227, 408/229, 230; *B23B 51/02*
See application file for complete search history.

(56) References Cited

U.S. PATENT DOCUMENTS

| | | | |
|---|---|---|---|
| 2,966,081 A | 12/1960 | Kallio | |
| 4,583,888 A * | 4/1986 | Mori et al. | 408/59 |
| 4,826,368 A * | 5/1989 | Tikal et al. | 408/225 |
| 4,983,079 A * | 1/1991 | Imanaga et al. | 408/230 |
| 5,230,593 A * | 7/1993 | Imanaga et al. | 408/230 |
| 5,423,640 A * | 6/1995 | Lindblom et al. | 408/230 |
| 5,609,447 A * | 3/1997 | Britzke et al. | 408/230 |
| 5,628,837 A * | 5/1997 | Britzke et al. | 148/208 |
| 5,641,251 A * | 6/1997 | Leins et al. | 408/144 |
| 6,132,149 A * | 10/2000 | Howarth et al. | 408/230 |
| 6,174,111 B1 * | 1/2001 | Anjanappa et al. | 408/1 R |
| 6,929,434 B2 * | 8/2005 | Prokop | 408/230 |
| 7,367,758 B2 * | 5/2008 | Turrini et al. | 408/230 |
| 7,530,772 B2 | 5/2009 | Reinhardt et al. | |
| 2003/0175085 A1 | 9/2003 | Prokop | |
| 2005/0135889 A1 | 6/2005 | Turrini et al. | |
| 2009/0028654 A1 * | 1/2009 | Turrini | 408/1 R |

FOREIGN PATENT DOCUMENTS

| | | |
|---|---|---|
| EP | 0 127 009 | 1/1987 |
| EP | 0 891 239 | 5/2001 |
| EP | 1 203 828 | 5/2002 |

* cited by examiner

*Primary Examiner*—Eric A Gates
(74) *Attorney, Agent, or Firm*—Drinker Biddle & Reath LLP

(57) ABSTRACT

A twist drill for metal cutting, made of cemented carbide, including helical chip flutes extending through an entire body of the twist drill or a part thereof, a shank to be secured to a rotary spindle, two main cutting edges, and two leading edges. The leading edges have a larger edge radius than that of the cutting edges.

10 Claims, 2 Drawing Sheets

TWIST DRILL

This application claims priority under 35 U.S.C. §119 to Swedish Patent Application No. 0501562-3, filed on Jul. 5, 2005, the disclosure of which is incorporated by reference herein in its entirety.

FIELD OF THE INVENTION

The present invention relates generally to a twist drill for metal cutting operations. Such drills normally have a cylindrical basic component which is divided into a shaft and a cutting portion. Chip flutes are made in the surface of the cutting portion. The drill has main cutting edges and leading edges.

BACKGROUND OF THE INVENTION

A twist drill of cemented carbide is manufactured from a cylindrical blank which is machined by grinding to a desired shape and dimension in particular to form cutting edges and flutes. As a result of the grinding, sharp edges are formed.

Solid cemented carbide drills are often most worn at the periphery of the cutting edge. This may be explained by the fact that the cutting speed is higher in the periphery, and consequently continuous wear mechanisms act more rapidly due to the higher temperature generated in this zone. However, discontinuous wear mechanism is often the cause of the wear in the periphery, e.g. adhesion wear acting at the main cutting edge can in the end cause breakage of the edge. In order to suppress the adhesion wear, the cutting edges are made as sharp as possible to reduce the cutting forces.

An object of the invention is to provide a twist drill with increased tool life.

It is a further object of the invention to provide a twist drill with reduced wear in the corner between the main cutting edge and the leading edge.

It is yet a further object to provide a method of making a twist drill with increased tool life.

SUMMARY OF THE INVENTION

In an embodiment, the invention provides a twist drill for metal cutting, made of cemented carbide, including helical chip flutes extending through an entire body of the twist drill or a part thereof, a shank to be secured to a rotary spindle, two main cutting edges, and two leading edges. The leading edges have a larger edge radius than that of the cutting edges.

In another embodiment, the invention provides a method of making a twist drill for metal cutting made of a cemented carbide body, including grinding at least two helical chip flutes extending through the entire body or a part thereof, a shank to be secured to a rotary spindle, two main cutting edges, and two leading edges. The leading edges are subjected to a subsequent edge rounding operation to an edge radius larger than that of the cutting edges.

In yet another embodiment, the invention provides a twist drill for metal cutting, including an elongate cylindrical body having a cutting end portion and a shank end portion, two main cutting edges formed at the cutting end portion, two helical chip flutes formed in a periphery of the body and extending between the cutting end portion and the shank end portion, and two leading edges defined by a peripheral surface of the body and the respective chip flutes, the leading edges defining corners with respective main cutting edges. The leading edges proximate the corners have a larger edge radius than the main cutting edges.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
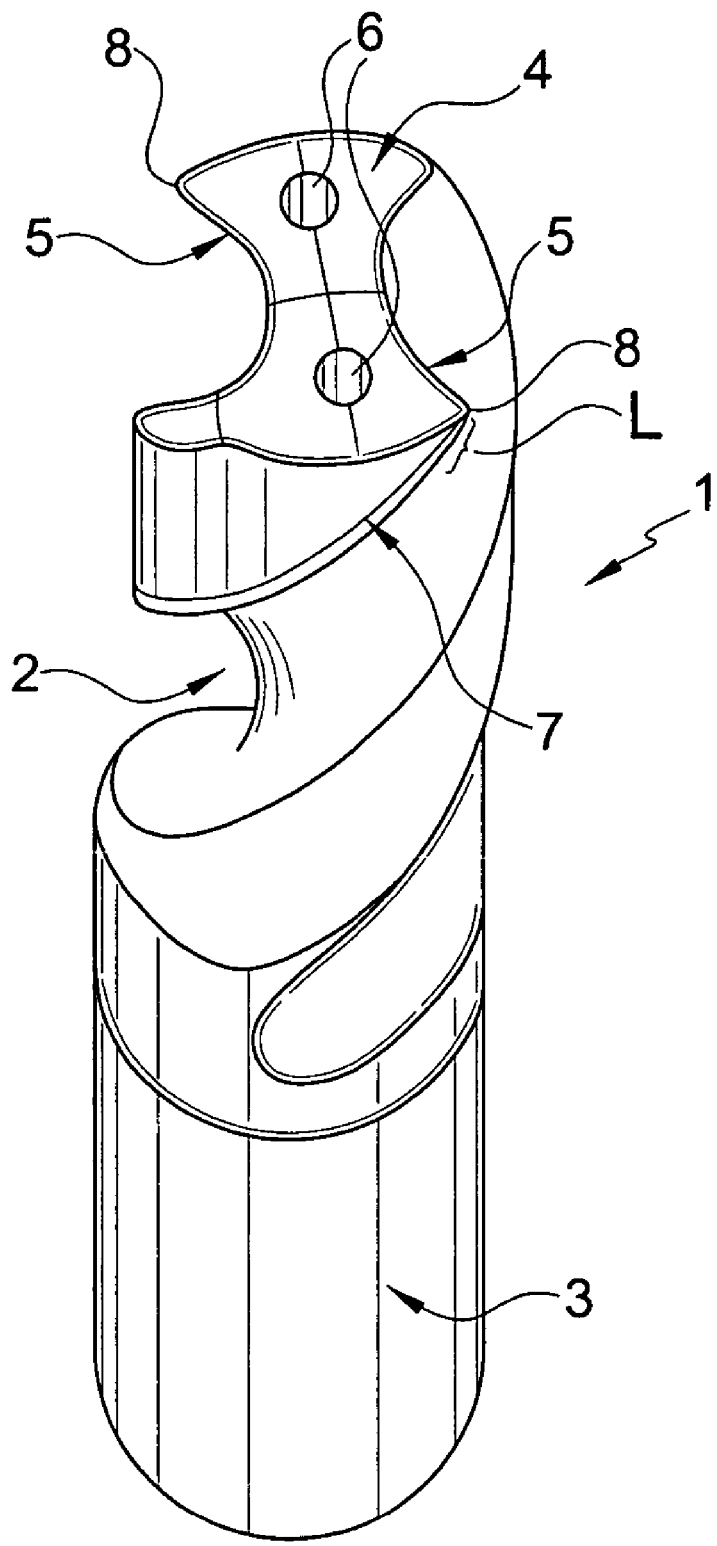
FIG. 1 is a twist drill according to an embodiment of the invention.

In a twist drill according to an embodiment of the invention shown in FIG. 1, the drill 1 is made of solid cemented carbide and includes helical chip flutes 2 extending through the entire drill body or through a part thereof. The drill has a shank 3 to be secured to a rotary spindle, not shown. The drill has two upper clearance surfaces 4, two main cutting edges 5 and two leading edges 7. The drill may be provided with two flush channels 6 extending through the entire drill to transfer flushing medium from the spindle to the tip of the drill.

The main cutting edges 5 are as sharp as possible with an edge radius of <10 μm. The leading edges 7 near respective corners 8 formed with the cutting edges 5 have an edge radius larger than that of the cutting edge, preferably at least twice the size of the edge radius for the cutting edge and between 10 and 200 μm, preferably between 10 and 100 μm. The length L of the leading edge subjected to rounding is at least 1 mm, preferably 3 mm and preferably less than 10 mm. The drill may be uncoated, or provided with a single or multiple coating, as known in the art.

An embodiment of the invention also provides a method of making twist drills, including providing a cylindrical blank, machining the blank to form a twist drill 1 including chip flutes 2 and leading edges 7 by grinding. According to the invention the leading edges 7, near the corner 8 to the cutting edges 5, are subsequently subjected to an edge rounding operation to an edge radius larger than that of the cutting edge, preferably at least twice the size of the edge radius for the cutting edge and between 10 and 200 μm, preferably between 10 and 100 μm. The length L of the leading edge subjected to rounding is at least 1 mm, preferably 3 mm and preferably less than 10 mm.

An embodiment of the invention further provides the use of the drill 1 for drilling in steel and stainless steel at a typical cutting speed Vc=50-150 m/min and a Feed f=0.10-0.50 mm/rev.

Testing has been conducted on a number of cemented carbide twist drills having a diameter of 8 mm, a composition of WC=89.5 wt-%, Co=10.0 wt-%, and $Cr_3C_2$=0.45 wt-%, and having a hardness of 1600 HV3. The twist drills were manufactured according to standard procedure, and were selected with sharp cutting and leading edges. Half of the drills were subjected to a further edge rounding operation of the leading edges to an edge radius of 30-50 μm, at a distance of 3 mm from the corner to the cutting edges. All the drills were then coated with a 3 μm thick PVD coating type TiAlN in the same coating batch.

The twist drills were subjected to a machining test in steel with the following test conditions:

| | |
|---|---|
| Work material: | Tough hardened steel SS2244 (similar to AISI 4140) |
| Cutting speed: | Vc = 70 m/min |
| Feed: | f = 0.15 mm/rev |
| Depth of hole: | a = 18 mm, throughholes |
| Tool life criteria: | Breakage at the corner between the cutting edge and leading edge. |

The following results were obtained:

| | Tool life (Number of holes) |
|---|---|
| Drills without further edge rounding: | 200-250 |
| Drills with further edge rounding: | 1300-1350 |

Figure 2:
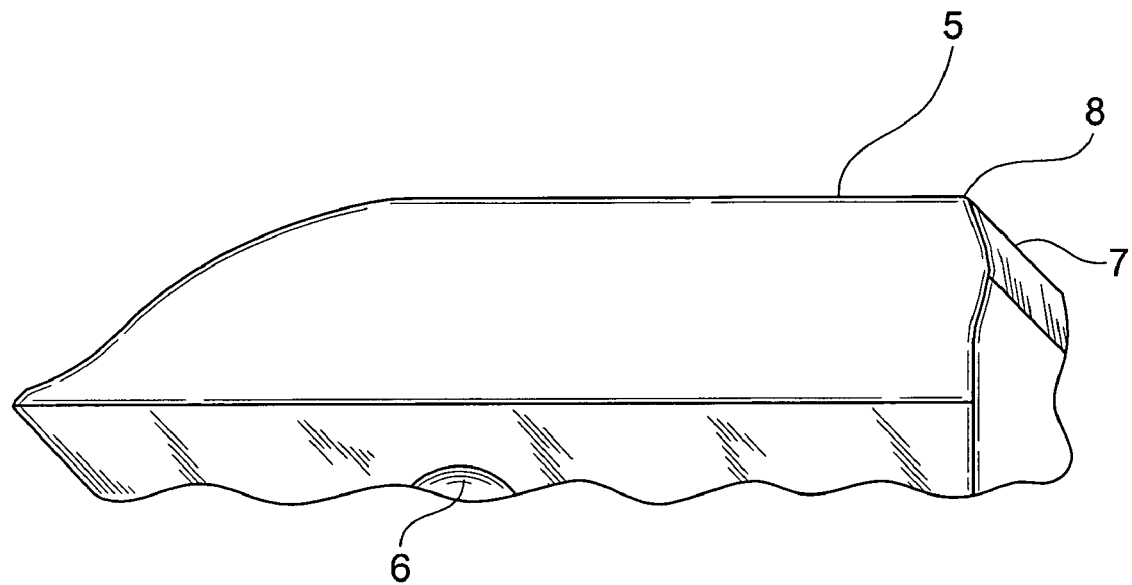
FIG. 2 illustrates the wear pattern of a twist drill according to an embodiment of the invention, at 20× magnification.
Figure 3:
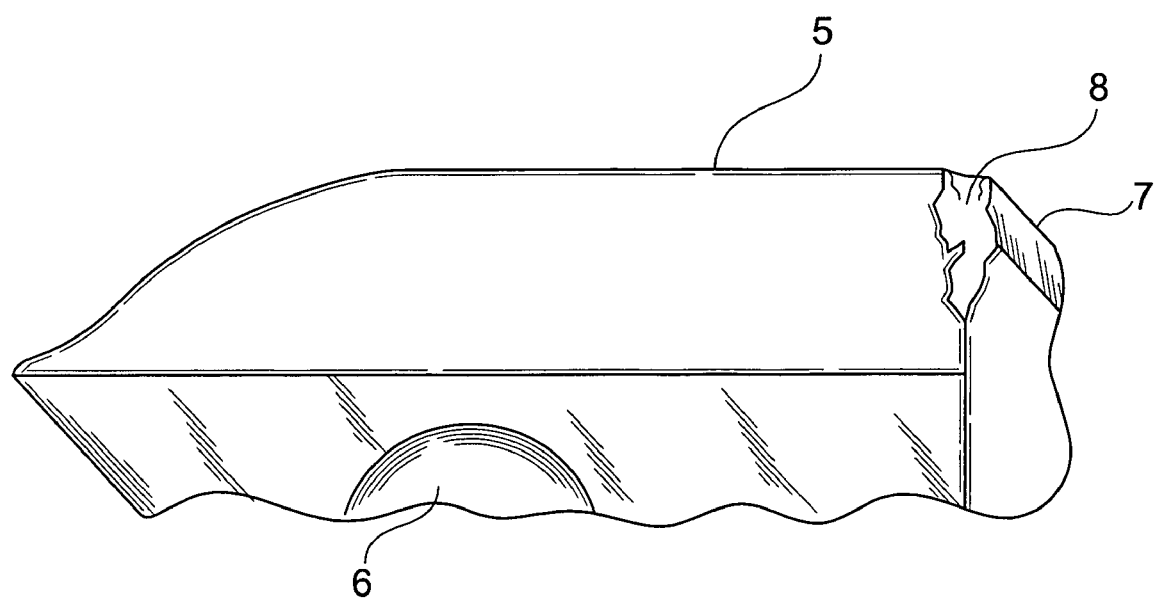
FIG. 3 illustrates the wear pattern of a prior art twist drill, at 20× magnification.

A typical wear pattern of drills according to the invention after 500 holes is shown in FIG. 2 and that of a prior art drill after 200-250 holes in FIG. 3. Referring to FIG. 3, the corner 8 of the prior art drill has broken.

While the invention has been disclosed with reference to certain preferred embodiments, numerous modifications, alterations, and changes to the described embodiments are possible without departing from the sphere and scope of the invention, as defined in the appended claims and their equivalents thereof. For example, the invention has been described with reference to a twist drill with two cutting and leading edges but it can as well be applied to twist drills with three or more such edges. Accordingly, it is intended that the invention not be limited to the described embodiments, but that it have the full scope defined by the language of the following claims.

What is claimed is:

1. A twist drill for metal cutting made of cemented carbide, comprising: helical chip flutes extending through an entire body of the twist drill or a part thereof, a shank to be secured to a rotary spindle, two main cutting edges, and two leading edges, wherein the leading edges have a larger edge radius than that of the cutting edges, and wherein an edge rounding of the leading edges extends at least 1 mm from respective corners formed at intersections of the main cutting edges and the leading edges.

2. The twist drill according to claim 1, wherein the edge radius of the leading edges is at least twice as long as the edge radius of the cutting edges.

3. The twist drill according to claims 1, wherein the cutting edges have an edge radius of <10 μm.

4. The twist drill according to claim 1, wherein the leading edges have an edge radius of 10-200 μm.

5. The twist drill according to claim 1, wherein the edge rounding of the leading edges extends at least 3 mm from the respective corners formed at the intersections of the main cutting edges and the leading edges.

6. A method of using the twist drill according to claim 1, comprising: drilling in one of steel and stainless steel at a cutting speed of approximately 50-150 m/min and at a feed of approximately 0.10-0.50 mm/rev.

7. The twist drill according to claim 1, wherein the edge rounding of the leading edges extends less than 10 mm from the corners formed at the intersections of the main cutting edges and the leading edges.

8. A twist drill for metal cutting, comprising:
an elongate cylindrical body including a cutting end portion and a shank end portion;
two main cutting edges formed at the cutting end portion;
two helical chip flutes formed in a periphery of the body and extending between the cutting end portion and the shank end portion; and
two leading edges defined by a peripheral surface of the body and the respective chip flutes, the leading edges defining corners with respective main cutting edges,
wherein the leading edges proximate the corners have a larger edge radius than the main cutting edges, and
wherein an edge rounding of the leading edges extends at least 1 mm from the corners formed at the intersections of the main cutting edges and the leading edges.

9. The twist drill according to claim 8, wherein the body is formed of cemented carbide.

10. The twist drill according to claim 8, wherein the edge rounding of the leading edges extends less than 10 mm from the corners formed at the intersections of the main cutting edges and the leading edges.

* * * * *